(12) United States Patent
Wang

(10) Patent No.: US 7,787,191 B2
(45) Date of Patent: Aug. 31, 2010

(54) ZOOM LENS

(75) Inventor: Kuo-Chuan Wang, Hsinchu (TW)

(73) Assignee: Young Optics Inc., Hsinchu (TW)

( * ) Notice: Subject to any disclaimer, the term of this patent is extended or adjusted under 35 U.S.C. 154(b) by 229 days.

(21) Appl. No.: 11/851,901

(22) Filed: Sep. 7, 2007

(65) Prior Publication Data
US 2008/0252991 A1 Oct. 16, 2008

(30) Foreign Application Priority Data
Apr. 14, 2007 (TW) .............................. 96113184 A

(51) Int. Cl.
G02B 15/14 (2006.01)
(52) U.S. Cl. ........................ 359/682; 359/680; 359/691
(58) Field of Classification Search ......... 359/680–682, 359/691
See application file for complete search history.

(56) References Cited

U.S. PATENT DOCUMENTS

| 4,370,031 | A | * | 1/1983 | Ikemori ....................... 359/681 |
| 4,477,153 | A | * | 10/1984 | Suda et al. .................. 359/680 |
| 4,770,509 | A | * | 9/1988 | Hayashi et al. ............. 359/682 |
| 5,546,232 | A | | 8/1996 | Hirakawa |
| 5,552,937 | A | | 9/1996 | Ono et al. |
| 6,404,564 | B1 | | 6/2002 | Yamada |
| 6,809,882 | B2 | | 10/2004 | Takatsuki |
| 6,839,183 | B2 | | 1/2005 | Ohashi |
| 6,917,477 | B2 | | 7/2005 | Takatsuki |
| 7,061,687 | B2 | | 6/2006 | Adachi |
| 7,075,729 | B2 | | 7/2006 | Wang |
| 7,075,733 | B2 | | 7/2006 | Itoh |
| 7,167,318 | B2 | | 1/2007 | Tomioka ....................... 359/682 |
| 2003/0184876 | A1 | * | 10/2003 | Tomioka ....................... 359/691 |
| 2003/0234985 | A1 | * | 12/2003 | Sato ............................ 359/680 |
| 2004/0184161 | A1 | * | 9/2004 | Takatsuki .................... 359/691 |

FOREIGN PATENT DOCUMENTS

TW 470851 1/2002

OTHER PUBLICATIONS

Chinese Examination Report of Taiwan Application No. 096113184, dated on Mar. 17, 2010.

* cited by examiner

Primary Examiner—Scott J Sugarman
(74) Attorney, Agent, or Firm—J.C. Patents

(57) ABSTRACT

A zoom lens including a first lens group with a negative refractive power and a second lens group with a positive refractive power is provided. The first lens group is composed of a first lens, a second lens, and a third lens. Refractive powers of the first lens, the second lens, and the third lens are respectively negative, negative, and positive. Moreover, the second lens group is disposed between the first lens group and an image side. The second lens group is composed of a fourth lens, a fifth lens, and a sixth lens. Refractive powers of the fourth lens, the fifth lens, and the sixth lens are respectively positive, negative, and positive. The first lens group and the second lens group are capable of moving between an object side and the image side. The zoom lens has advantages of wide angle and small volume.

8 Claims, 6 Drawing Sheets

ZOOM LENS

CROSS-REFERENCE TO RELATED APPLICATION

This application claims the priority benefit of Taiwan application serial no. 96113184, filed on Apr. 14, 2007. All disclosure of the Taiwan application is incorporated herein by reference.

BACKGROUND OF THE INVENTION

1. Field of the Invention

The present invention relates to a lens. More particularly, the present invention relates to a zoom lens.

2. Description of Related Art

Referring to FIG. 1, a zoom lens 100 disclosed in U.S. Pat. No. 5,552,937 includes a first lens group 110 and a second lens group 120. The first lens group 110 is composed of three lenses 112, 114, 116, and the second lens group 120 is composed of four lenses 122, 124, 126, 128. In the zoom lens 100, in order to eliminate image aberration and chromatic aberration, more than one aspheric lens is used in the first lens group 110 and the second lens group 120. That is, many aspheric lenses are used in the zoom lens 100 to achieve wide angle.

Although the aspheric lens has a fine effect for rectifying image aberration, a strict tolerance requirement is brought forward in the mass production when too many aspheric lenses are used. If the tolerance is not controlled in the mass production, the overall yield is reduced. Moreover, since the aspheric lens has a high cost, the cost of the zoom lens 100 is increased if too many aspheric lenses are used in the zoom lens 100.

Referring to FIG. 2, a zoom lens 200 disclosed in U.S. Pat. No. 6,839,183 includes a first lens group 210, a second lens group 220, and a third lens group 230. The first lens group 210 is composed of three lenses 212, 214, 216, the second lens group 220 is composed of three lenses 222, 224, 226, and the third lens group 230 is composed of one lens 232. Moreover, the zoom lens 200 further includes an aperture stop 240 movably disposed between the first lens group 210 and the second lens group 220.

During the zoom lens 200 zooms in/zooms out, the aperture stop 240 moves together, thus the interlinking mechanism of the zoom lens 200 is quite complicated. Thereby, not only the volume of the zoom lens 200 is enlarged, but also the manufacturing cost of the zoom lens 200 is increased.

SUMMARY OF THE INVENTION

The present invention is related to a zoom lens having advantages of wide angle, small volume, and lower manufacturing cost.

Other advantages of the present invention can be further understood from the technical features disclosed by the present invention.

In order to achieve one or a part of or all of the above advantages or other advantages, the present invention provides a zoom lens including a first lens group with a negative refractive power and a second lens group with a positive refractive power. Moreover, the first lens group is composed of a first lens, a second lens, and a third lens arranged in order from an object side to an image side. Refractive powers of the first lens, the second lens, and the third lens are respectively negative, negative, and positive. The second lens group is disposed between the first lens group and the image side. The second lens group is composed of a fourth lens, a fifth lens, and a sixth lens arranged in order from the object side to the image side. Refractive powers of the fourth lens, the fifth lens, and the sixth lens are respectively positive, negative, and positive. The first lens group and the second lens group are capable of moving between the object side and the image side.

The zoom lens of the present invention adopts the combination of a first lens group with a negative refractive power and a second lens group with a positive refractive power and also a small number of aspheric lenses together to reduce image aberration and chromatic aberration effectively, thereby achieving wide angle. Moreover, when the zoom lens zooms in/zooms out, the aperture stop is fixed, so the interlinking mechanism of the zoom lens is simple. Thereby, the volume of the zoom lens is reduced, and the manufacturing cost is effectively reduced.

Other objectives, features and advantages of the present invention will be further understood from the further technology features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing,"

"faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
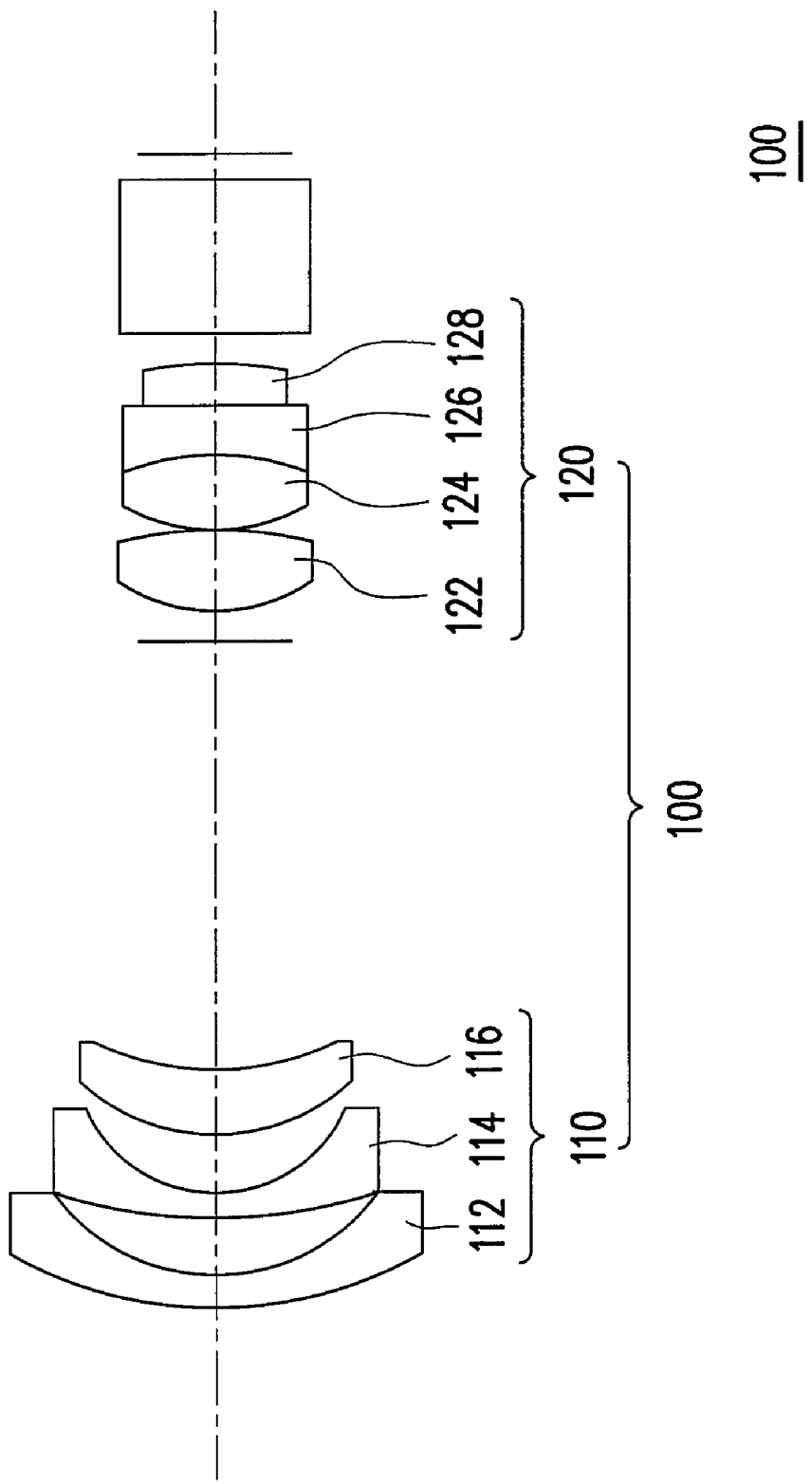
FIG. 1 is a schematic view of a conventional zoom lens.
Figure 2:
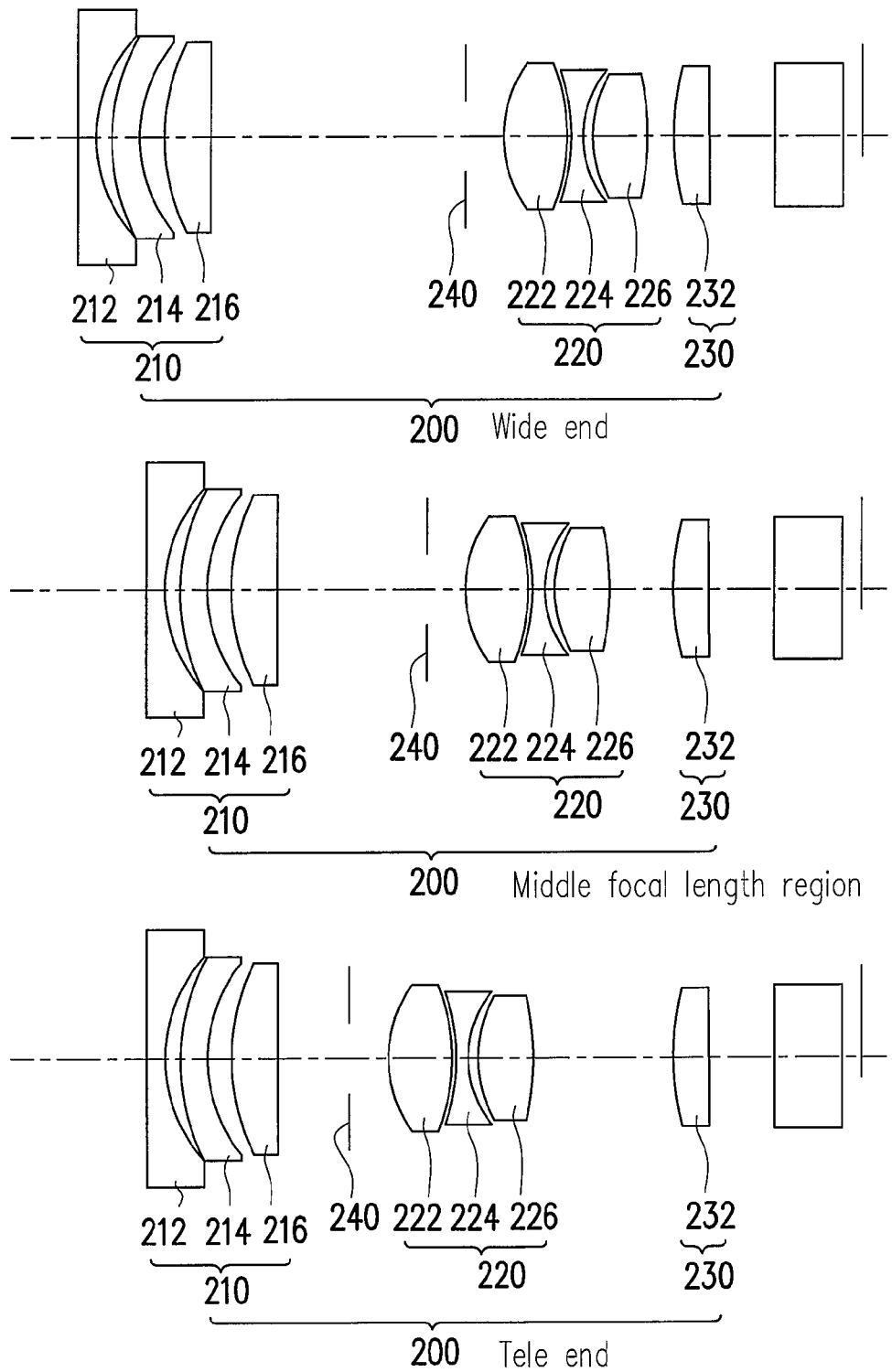
FIG. 2 is a schematic view of a conventional zoom lens having a focal length of a wide end, a middle focal length region, and a tele end.
Figure 3:
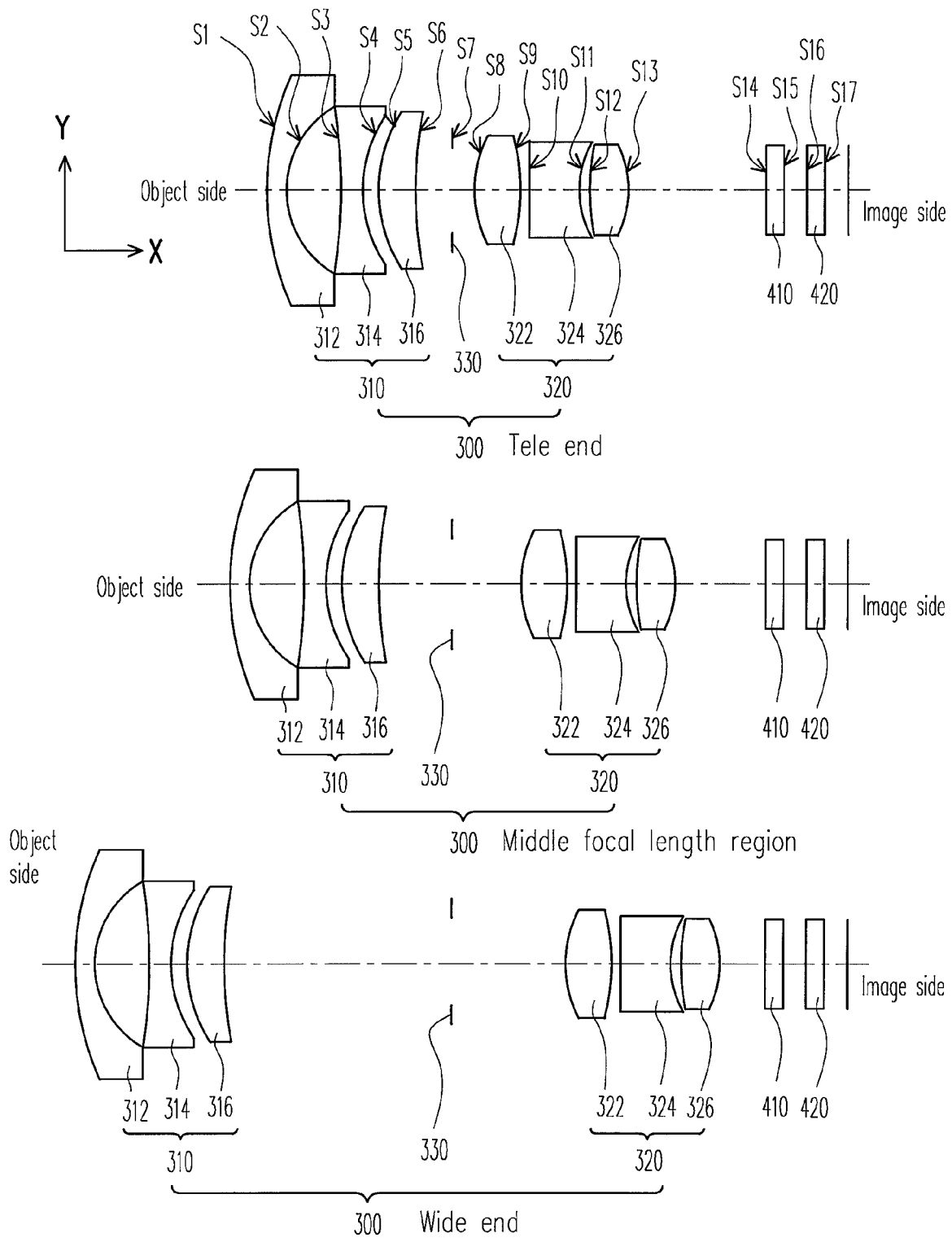
FIG. 3 is a schematic view of a zoom lens having a focal length of a wide end, a middle focal length region, and a tele end according to an embodiment of the present invention.

Referring to FIG. 3, the zoom lens 300 includes a first lens group 310 and a second lens group 320. Refractive powers of the first lens group 310 and the second lens group 320 are respectively negative and positive. The first lens group 310 is composed of a first lens 312, a second lens 314, and a third lens 316 arranged in order from an object side to an image side. Refractive powers of the first lens 312, the second lens 314, and the third lens 316 are respectively negative, negative, and positive. The second lens group 320 is disposed between the first lens group 310 and the image side. The second lens group 320 is composed of a fourth lens 322, a fifth lens 324, and a sixth lens 326 arranged in order from the object side to the image side. Refractive powers of the fourth lens 322, the fifth lens 324, and the sixth lens 326 are respectively positive, negative, and positive. The first lens group 310 and the second lens group 320 are capable of moving between the object side and the image side.

In the above zoom lens 300, the first lens 312, the second lens 314, and the third lens 316 are for example spherical lenses. At least one of the fourth lens 322, the fifth lens 324, and the sixth lens 326 is an aspheric lens. The fourth lens 322 is the aspheric lens in this embodiment. Moreover, the Abbe number of the fifth lens 324 is, for example, greater than 22. The Abbe number of at least one of the fourth lens 322 and the sixth lens 326 is, for example, greater than 80.

In this embodiment, the first lens 312 is, for example, a convex-concave lens having a convex surface (the surface S1) facing the object side, the second lens 314 is a biconcave lens, and the third lens 316 is a concave-convex lens having a convex surface (the surface S5) facing the object side. The fourth lens 322 is a biconvex lens, the fifth lens 324 is a plano-concave lens having a concave surface (the surface S11) facing the image side, and the sixth lens 326 is a biconvex lens. Moreover, the zoom lens 300 further includes an aperture stop 330 fixed between the first lens group 310 and the second lens group 320.

When the focal length of the zoom lens 300 is varied from a wide end to a middle focal length region or from a middle focal length region to a tele end, the first lens group 310 and the second lens group 320 move close to each other. On the contrary, when the focal length of the zoom lens 300 is varied from the middle focal length region to the wide end or from the tele end to the middle focal length region, the first lens group 310 and the second lens group 320 move far away from each other. It should be noted that the aperture stop 330 is fixed during the zoom in/zoom out.

When the focal length of the zoom lens 300 is at the wide end, the f-number (ratio of the focal length to the aperture, focal length/aperture) of the zoom lens 300 is N1, and the effective focal length is N2, the distance between the image side and the surface S1 of the first lens 312 facing the object side is D1, and the diameter of the first lens 312 is D2, where N1/N2>0.6, and D2/D1<0.32. Therefore, the thickness of the zoom lens 300 (total length in Y direction) is limited, thereby reducing the volume of the zoom lens 300. The zoom lens 300 of this embodiment adopts the combination of five spherical lenses and one aspheric lens and also uses the first lens group 310 with the negative refractive power and the second lens group 320 with the positive refractive power together to reduce image aberration and chromatic aberration, thereby achieving wide angle. Due to the small number of the aspheric lenses, the cost of the aspheric lenses is saved, and the manufacturing yield is increased. Moreover, during the zoom in/zoom out, the aperture stop 330 is fixed, thus the interlinking mechanism of the zoom lens 300 is simple, such that not only the cost is reduced, but also the zoom lens 300 has an advantage of small volume.

Furthermore, the zoom lens 300 has characteristics of wide angle and large aperture. The first lens group 310 and the second lens group 320 have a focusing function respectively, so the zoom lens 300 is flexible in using. Moreover, the zoom lens 300 has a characteristic of long depth of field. When the distance between the zoom lens 300 and the object changes, the imaging quality is still fine without a focusing action. Moreover, the Abbe number of the fifth lens 324 is limited to be greater than 22, the Abbe number of at least one of the fourth lens 322 and sixth lens 326 is limited to be greater than 80, so as to eliminate chromatic aberration effectively.

One embodiment of the zoom lens 300 is given hereinafter, but the data listed below is not used for limiting the present invention. The parameters or settings can be altered by persons skilled in the art with reference to the disclosure of the present invention, which still falls in the scope of the present invention.

TABLE 1

| Surface | Radius of Curvature (mm) | Interval (mm) | Refractive Index | Abbe Number | Remarks |
|---|---|---|---|---|---|
| Object Side | Infinite | 1500 | | | |
| S1 | 15.76 | 1.00 | 1.834 | 37.2 | The First Lens |
| S2 | 5.36 | 2.61 | | | |
| S3 | −26.84 | 1.00 | 1.64 | 60.1 | The Second Lens |
| S4 | 8.44 | 0.94 | | | |
| S5 | 9.52 | 1.72 | 1.847 | 23.8 | The Third Lens |
| S6 | 37.66 | Variable Interval(d1) | | | |
| S7 | Infinite | Variable Interval (d2) | | | Aperture Stop |
| S8 | 5.85091 | 2.18 | 1.847 | 23.8 | The Fourth Lens |
| S9 | −9.18081 | 0.41 | | | |
| S10 | Infinite | 2.50 | 1.678 | 54.9 | The Fifth Lens |
| S11 | 4.94 | 0.38 | | | |
| S12 | 13.13 | 1.84 | 1.497 | 81.5 | The Sixth Lens |
| S13 | −7.16 | Variable Interval (d3) | | | |
| S14 | Infinite | 0.952 | 1.544 | 70.1 | Low Pass Filter |
| S15 | Infinite | 1.00 | | | |
| S16 | Infinite | 0.80 | 1.517 | 64.1 | IR Cut Filter |
| S17 | Infinite | 1.16 | | | |
| Image Side | Infinite | | | | |

In Table 1, the radius of curvature refers to the radius of curvature of each surface, and the Interval refers to the distance between two neighboring surfaces. For example, the Interval of the surface S1 refers to the distance between the surface S1 and the surface S2. The corresponding thickness, refractive index, and Abbe number of each lens in the Remarks column refers to the value of each pitch, refractive index, and Abbe number in the same row. Moreover, the surfaces S1 and S2 are two surfaces of the first lens 312, the surfaces S3 and S4 are two surfaces of the second lens 314, and the surfaces S5 and S6 are two surfaces of the third lens 316. The surface S7 is the surface of the aperture stop 330. The surfaces S8 and S9 are two surfaces of the fourth lens 322, the surfaces S10 and S11 are two surfaces of the fifth lens 324, and the surfaces S12 and S13 are two surfaces of the sixth lens 326. The surfaces S14 and S15 are two surfaces of a low pass filter 410, and the surfaces S16 and S17 are two surfaces of an infrared (IR) cut filter 420. Moreover, when the zoom lens 300 is used to capture an image, an image sensor such as a charge coupled device (CCD) or a CMOS image sensor is disposed at the image side. When the zoom lens 300 is used to project an image, a light valve such as a digital micro-mirror device (DMD) or a liquid crystal on silicon panel (LCOS panel) is disposed at the image side.

Furthermore, the surfaces S8 and S9 are aspheric surfaces expressed by a formula as follows:

$$X = \frac{(1/R)H^2}{1+\sqrt{1-(1+K)(H/R)^2}} + AH^4 + BH^6 + CH^8 + DH^{10}$$

where X is an offset in the direction of the optical axis; R is the radius of an osculating sphere, i.e., the radius of curvature close to the optical axis (the radius of curvatures of S8 and S9). K is a conic constant and H is an aspheric height, i.e., the height from the center to the edge of the lens. It can be known from the formula that different H values are corresponding to different X values. A, B, C, and D are aspheric coefficients. The aspheric coefficients and K values of the surface S8 and S9 are shown in Table 2:

TABLE 2

| Surface | K | A | B | C | D |
|---------|---|---|---|---|---|
| S8 | 0 | −0.100677E−02 | −0.916864E−04 | 0.12644E−04 | −0.151224E−05 |
| S9 | 0 | 0.718213E−03 | −0.691854E−04 | 0.437529E−05 | −0.88594E−06 |

TABLE 3

| | | Wide end | Middle Focal Length Region | Tele end |
|---|---|---|---|---|
| Effective Focal Length(mm) | | 2.78 | 4.92 | 7.25 |
| F-number | | 1.9 | 2.3 | 3.1 |
| Field of View (degrees) | | 93.7 | 51.7 | 35 |
| Variable Interval (mm) | d1 | 1.342 | 20.443 | 26.235 |
| | d2 | 25.893 | 6.792 | 1.000 |
| | d3 | 8.502 | 3.125 | 15.145 |

In Table 3, some important parameters including effective focal length, field of view (FOV), f-number, and variable pitches d1, d2, and d3 when the focal length of the zoom lens 300 is at the wide end, the middle focal length region, and the tele end are listed.

Since the f-number of the zoom lens 300 according to the embodiment of the present invention is as little as 1.9, thus the embodiment has an advantage of a large aperture. Moreover, the FOV of the zoom lens 300 at the wide end reaches 93.7 degrees, thus the embodiment has an advantage of wide angle.

Figure 4A:
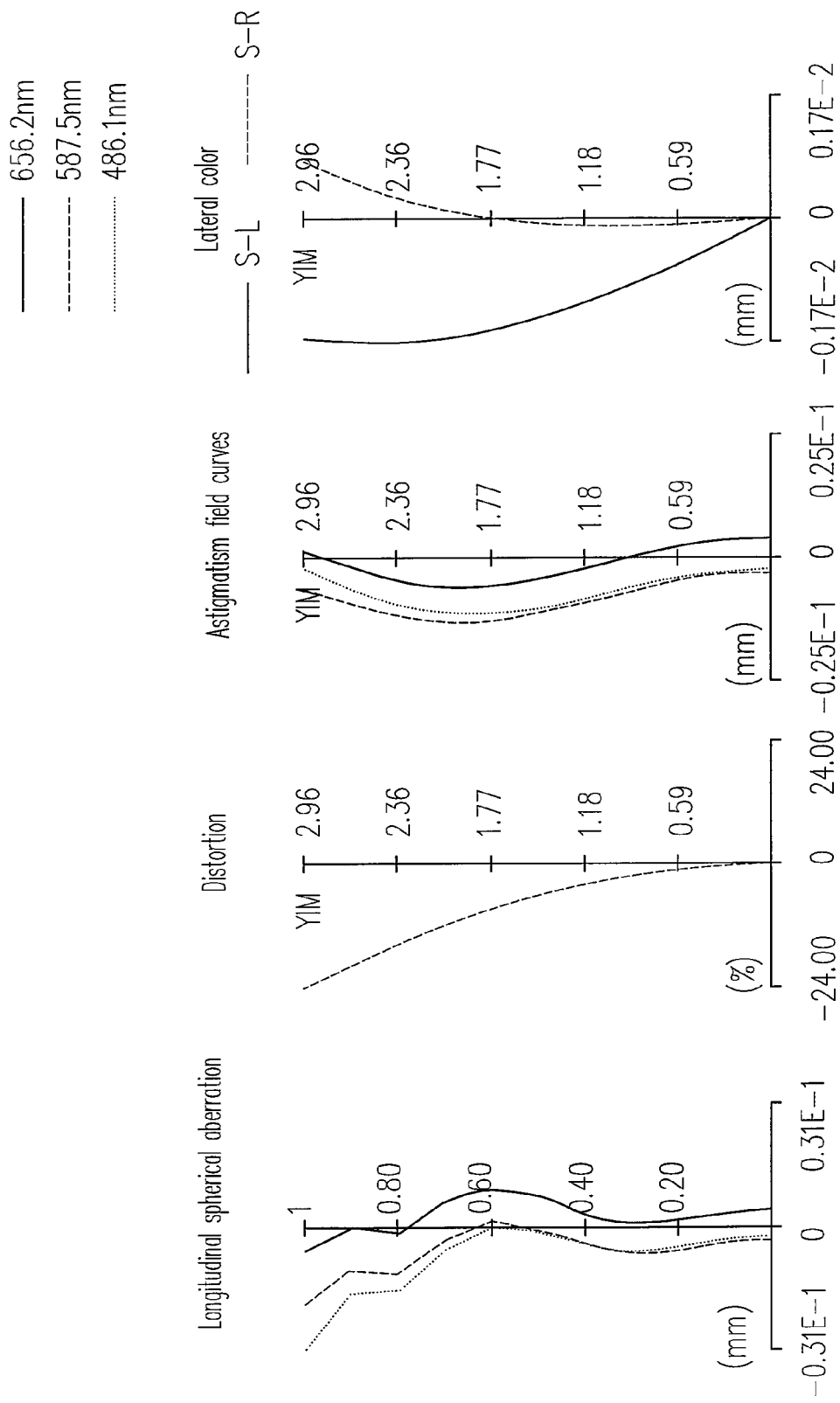
FIGS. 4A to 4C are reference diagrams of optical quality of the zoom lens having the focal length at the wide end, the middle focal length region, and the tele end in FIG. 3.
Figure 4B:
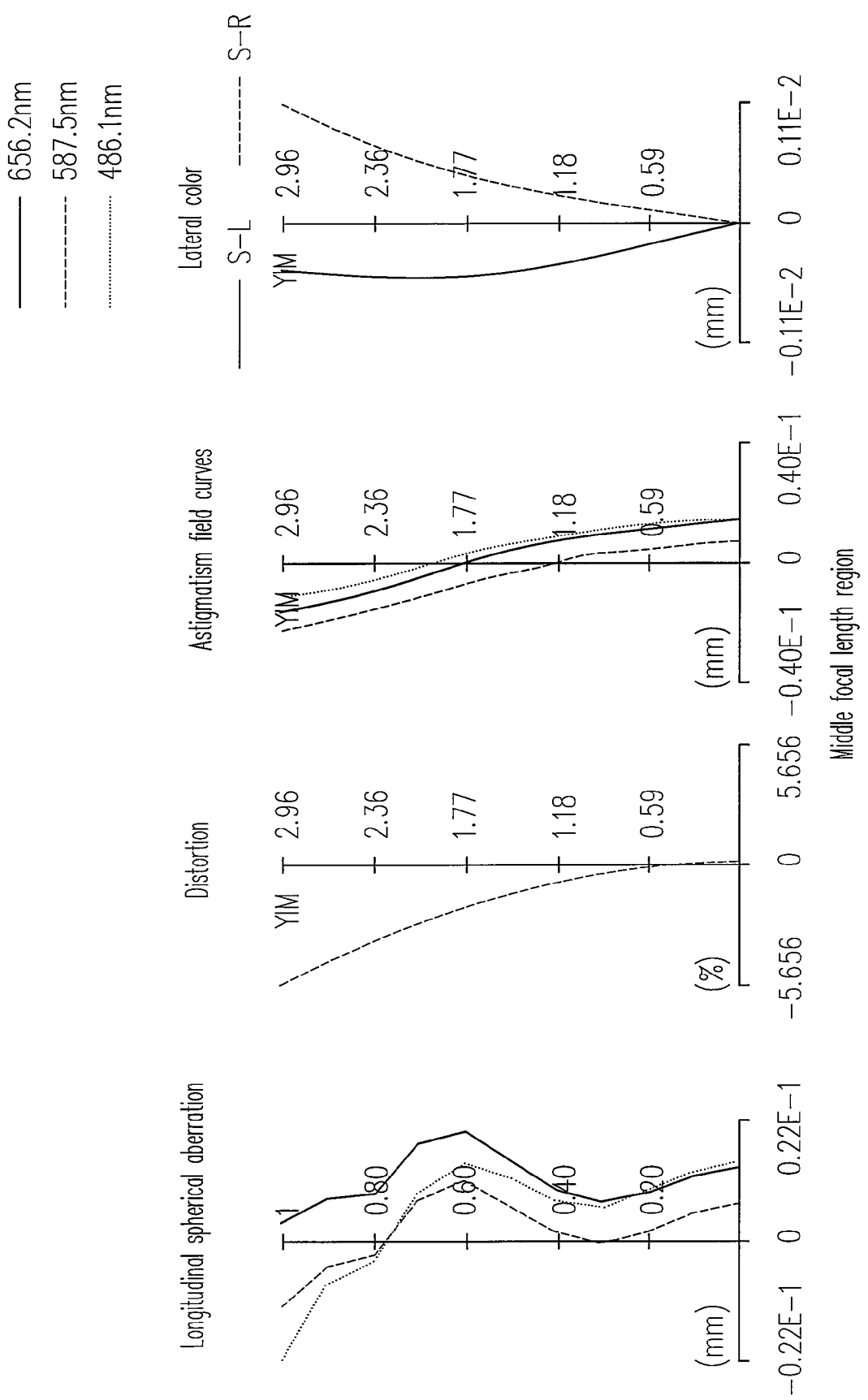
Figure 4C:
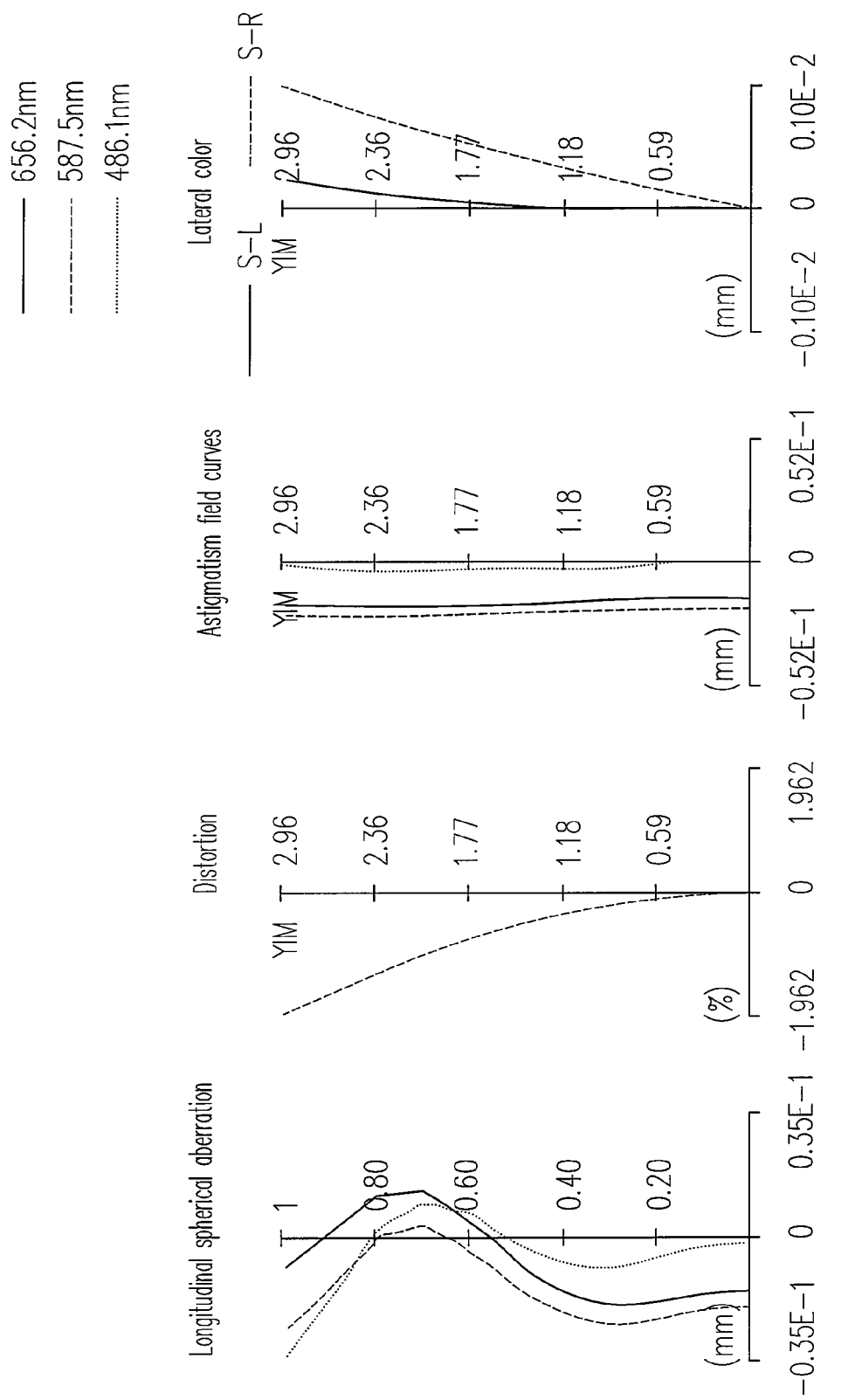

Longitudinal spherical aberration, distortion, astigmatism field curves, and lateral color shown in FIGS. 4A to 4C all indicate that a fine imaging quality is provided when the focal length of the zoom lens 300 is at the wide end, the middle focal length region, and the tele end. Therefore, the zoom lens 300 of this embodiment has advantages of small volume and low cost and maintaining a fine imaging quality.

On the basis of the above, the zoom lens of the embodiments of the present invention has one or a part of or all of the following advantages.

1. A small number of aspheric lenses are used in the zoom lens of the present invention, such that not only the cost of the aspheric lens is saved, but also the manufacturing yield is increased. Therefore, the manufacturing cost of the zoom lens of the present invention is low.

2. When the zoom lens zooms in/zooms out, the aperture stop is fixed, thus the interlinking mechanism of the zoom lens is simple. Thereby, the volume of the zoom lens is reduced, and the manufacturing cost of the zoom lens is also reduced.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A zoom lens, comprising:
   a first lens group, having a negative refractive power, and composed of a first lens, a second lens, and a third lens arranged in order from an object side to an image side, wherein refractive powers of the first lens, the second lens, and the third lens are respectively negative, negative, and positive; and
   a second lens group, disposed between the first lens group and the image side, having a positive refractive power, and composed of a fourth lens, a fifth lens, and a sixth lens arranged in order from the object side to the image side, wherein refractive powers of the fourth lens, the fifth lens, and the sixth lens are respectively positive, negative, and positive, wherein the fourth lens is an aspheric lens, and wherein the fourth lens and the sixth lens are biconvex lenses, an Abbe number of the fifth lens is greater than 22, and an Abbe number of at least one of the fourth lens and the sixth lens is greater than 80;
   wherein the first lens group and the second lens group are capable of moving between the object side and the image side.

2. The zoom lens as claimed in claim 1, wherein the first lens, the second lens, and the third lens are spherical lenses.

3. The zoom lens as claimed in claim 1, wherein at least one of the fifth lens and the sixth lens is an aspheric lens.

4. The zoom lens as claimed in claim 1, wherein the fifth lens is a plano-concave lens having a concave surface facing the image side.

5. The zoom lens as claimed in claim 1, further comprising an aperture stop fixed between the first lens group and the second lens group.

6. The zoom lens as claimed in claim 1, wherein an f-number of the zoom lens is N1, and an effective focal length of the zoom lens is N2, where N1/N2>0.6, when a focal length of the zoom lens is at a wide end.

7. The zoom lens as claimed in claim 1, wherein a distance between the image side and a surface of the first lens facing the object side is D1, and a diameter of the first lens is D2, where D2/D1<0.32, when a focal length of the zoom lens is at a wide end.

8. The zoom lens as claimed in claim 1, wherein the first lens is a convex-concave lens having a convex surface facing the object side, the second lens is a biconcave lens, the third lens is a concave-convex lens having a convex surface facing the object side, the fourth lens is a biconvex lens, the fifth lens is a plano-concave lens having a concave surface facing the image side, and the sixth lens is a biconvex lens.

* * * * *